(12) United States Patent
Arendes et al.

(10) Patent No.: US 7,194,794 B2
(45) Date of Patent: Mar. 27, 2007

(54) METHOD FOR PRODUCING ELECTRICAL MACHINES

(75) Inventors: Dieter Arendes, Hildesheim (DE); Christian Werthmann, Hildesheim (DE); Maik Seidel, Hildesheim (DE); Lars Blenkle, Alfeld (DE); Mirko Bunzel, Algermissen (DE)

(73) Assignee: Robert Bosch GmbH, Stuttgart (DE)

( * ) Notice: Subject to any disclaimer, the term of this patent is extended or adjusted under 35 U.S.C. 154(b) by 106 days.

(21) Appl. No.: 10/874,033

(22) Filed: Jun. 22, 2004

(65) Prior Publication Data

US 2004/0263018 A1 Dec. 30, 2004

(30) Foreign Application Priority Data

Jun. 30, 2003 (DE) ................. 103 29 579

(51) Int. Cl.
*H02K 15/00* (2006.01)

(52) U.S. Cl. .............. 29/596; 29/597; 29/598; 29/605; 29/606; 29/625; 310/201; 310/208; 310/214; 310/234

(58) Field of Classification Search ............ 29/596, 29/597, 598, 605, 606, 825; 310/201, 208, 310/214, 234
See application file for complete search history.

(56) References Cited

U.S. PATENT DOCUMENTS 4,757,601 A * 7/1988 Leech et al. ................ 29/597
5,778,512 A 7/1998 Ichikawa et al.

FOREIGN PATENT DOCUMENTS

| AT | 286 433 | 12/1970 |
| DE | 8383 782 | 5/1952 |
| DE | 100 49 699 A1 | 5/2002 |

* cited by examiner

*Primary Examiner*—A. Dexter Tugbang
*Assistant Examiner*—Tim Phan
(74) *Attorney, Agent, or Firm*—Michael J. Striker

(57) ABSTRACT

An electrical machine has a base body provided with conductors fixed in grooves of the base body by a material which limits a groove slot at both sides, and the conductors in the grooves are deformed by a stamping punch introducible through the groove slot into the corresponding groove so that a conductor cross-section is adjusted to a groove cross-section in a region of the corresponding conductor.

8 Claims, 3 Drawing Sheets

METHOD FOR PRODUCING ELECTRICAL MACHINES

CROSS-REFERENCE TO RELATED DOCUMENT

The invention described and claimed hereinbelow is also described in DE 103 29 579.8, filed Jun. 30, 2003. This German Patent Application, whose subject matter is incorporated here by reference, provides the basis for a claim of priority of invention under 35 U.S.C. 119(a)–(d).

BACKGROUND OF THE INVENTION

The present invention relates to an electrical machine with a grooved base body provided with conductors, as well as to a method of producing electrical machine, and a device for producing the electrical machine.

Electrical machines as a rule have at least one base body composed of a lamellised, soft-magnetic packet of metal sheets, which carries a winding. The base body is a part of a stator or a support, and/or a part of a rotor or a runner or an armature, wherein the conductors of the winding are inserted in the grooves of the packet of metal sheets in an insulated manner and connected with one another. Stator and rotor cooperate through a so-called working air gap. For avoiding oscillation noise of the winding it is important to fix the conductors in the grooves as reliable as possible. Moreover, the conductor fixing for rotors which rotate at high speeds is important for avoiding conductor movements under the action of centrifugal forces, since it can lead, in addition to other issues, to imbalance on the rotor.

For this purpose it is known to fix the conductors in the grooves by an impregnating resin. This method is not only environmentally unfriendly, but also requires considerable apparatus investments as well as sequential process steps for removal of the impregnating resin on different regions of the machine, such as for example on a commutator, on bearing points and on an outer periphery of the rotor.

For avoiding these disadvantages it was proposed in the patent document DE 100 49 699 A1 to fix the conductors in the grooves of an armature packet of metal sheets of electrical machines by deformation of the material which limits at both sides the slots of the groove, against the groove bottom. Since the varnish-insulated conductors in many cases have a round cross-section for cost economy, in these solutions a relatively small groove packing factor is provided, so that the power of the machine is limited and/or the dimensions of the armature are increased. It is also generally known in order to increase the groove packing factor of the stamped conductors to use the conductors with square, rectangular or oval cross-sections in the correspondingly formed grooves. This is however expensive since for the grooves with several conductors the conductors must often have different cross-sectional shapes. This means that an expensive processing technology and thereby complex and additional machines or manufacturing stations must be provided. Furthermore, with an automatic manufacture, a conversion from round conductors to pre-formed conductors with conductor portions adapted to the groove cross-section can not be performed in an economical manner.

SUMMARY OF THE INVENTION

It is therefore an object of the present invention to improve the efficiency of the electrical machines with means with are as simple as possible with the use of conductors which are produced in cost-favorable manner, in particular with round cross-section, and to increase the filling factor of the slots significantly.

Moreover, it is an object of the present invention to provide also such means which can be used in available, automatic manufacturing devices in an efficient manner.

In keeping with these objects and with others which will become apparent hereinafter, one feature of the present invention resides, briefly stated, in an electrical machine, comprising a base body having a periphery which limits a working air gap and is provided with a plurality of grooves having art elongated cross-section with a groove slot adapted to face the working air gap; at least one electrical conductor extending in said groove slot over a length of said groove and fixed in said groove by a material of said base body which limits said groove slot at both sides, said at least one conductor in a respective one of said grooves being deformed over a whole length by a stamping punch inserted through said groove slot into said groove, so that a conductor cross-section is adjusted to a groove cross-section in a region of said at least one conductor.

Another feature of the present invention resides, briefly stated, a method of producing electrical machines, comprising providing a base body having a periphery which limits a working air gap and has a plurality of grooves of an elongated cross-section with a groove slot adapted to face the working air gap; introducing at least one electrical conductor in each of said grooves so that said at least one electrical conductor extends over a length of the groove and is fixed in said grooves by a material of the base body which limits the groove slot at both sides; and after insertion of the electrical conductors in the grooves of the base body, introducing a stamping punch into the open groove slot of the grooves and deforming the at least one conductor with the stamping punch over a whole groove length so that its conductor cross-section is adjusted to the groove cross-section in the region of the conductor.

Still another feature of the present invention resides, briefly stated an apparatus for producing an electrical machine having a base body with a periphery adapted to limit a working air gap and having a plurality of grooves with an elongated cross-section and a groove slot adapted to face the working air gap, and at least one electrical conductor extending in each of the grooves over the length of the groove and fixed by a material of the base body which limits the groove slot at both sides, the apparatus comprising a stamping punch operative for deforming a conductor cross-section and being a part of a stamping tool, wherein said stamping tool being provided with two pressing punches arranged at both sides of said stamping punch for deforming of edges which limit the groove slot at both sides, said pressing punches being axially set back relative to said stamping punch, opposite to a stamping direction.

When the solutions in accordance with the present invention are utilized, the groove packing is significantly improved by the deformation fo the conductors and the grooves, and during their deformation the packet of the metal sheets and the pole teeth located therebetween act as a stamping dye. Since conventionally an insulating material is located between the conductors and the groove wall, during the deformation a damage of the insulating varnish layer of the conductors is prevented by the lamellas edges of the packet of the metal sheet. A further advantage resides in that the additional working step of the deformation of the conductors inside the grooves can be simply integrated in existing manufacturing lines, since it has only little influence on receiving of subsequent process steps.

A preferable embodiment of the invention resides in an electrical machines, in which the base body is a drum-shaped armature packet of metal sheets which is arranged on a machine shaft. There the groove slots for insertion of a stamping punch for the deformation of the conductor cross-section are especially easily accessible. Preferably, in the grooves of the armature packet of metal sheets several conductors can be arranged parallel to one another and the total cross-section of all conductors is adjusted to a groove by the stamping punch of the total groove cross-section. In an especially advantageous manner, the packet of metal sheets operates as a dye which is favorable for the conductor deformation, when between the side walls of the grooves their width is increased to the groove slot.

The present invention is especially suitable for utilization in commutator runners, with two conductors which are arranged axially parallel to one another and radially over one another in the grooves, and whose conductor cross-section is adjusted by the stamping punch to the corresponding groove cross-section in the region of the corresponding conductor.

In a preferable embodiment of the present invention, after the stamping of the conductor in a groove for fixing this conductor in the groove, in a further stamping process the material which limits the groove slot at both sides is so pressed against the conductor and deform, that the groove slot is at least partially closed.

For the conductor deformation in the grooves with subsequent calking of the groove slot, advantageously a combined stamping tool is used. In a simple manner, the pressing punches for caulking of the groove slot are formed at both sides on the stamping punch, which are set back as punching shoulders against the end face of the punching stamp.

For controlling high centrifugal forces in motors which rotate at high speeds, the groove slots must be substantially closed. In order to obtain this, in accordance with a further embodiment of the invention, it is proposed to form both pressing stamps for groove caulking on the one hand and the punching stamp for conductor deformation on the other hand independently axially displaceable in a stamping direction, so that during groove caulking the stamping punch can move back from the groove slot.

In the simplest manner, the conductor deformation in the grooves and in some cases subsequent groove slot caulking are performed in steps from one groove to another. With a corresponding high expenses, it is however alternatively possible to perform the stamping steps on the conductors and groove slots on oppositely located or on all grooves of the base body simultaneously, for example by an iris-shaped stamping tool.

The method is used basically for any number of wires per groove, as well as for different wire diameters of the conductors. The use of a stamping tool with independently displaceable pressing and stamping punches for the conductor and groove slot deformation has the advantage that the grooves can be completely closed. Moreover, the stamping punch for the conductor deformation can be formed wider. Thereby the danger that the conductor cross-section during the deformation radially flows on the stamping punch is reduced. Moreover, the stamping punch obtains in this way a higher rigidity. Since the independent pressing and stamping punches two tool parts must be controlled with laterally offset movements, a relatively complicated tool construction is provided, whose use in the iris-shaped stamping tools is less suitable than the robust tool concept with only one stamping punch for the conductor deformation and its both-side stamping shoulders for groove slot caulking.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
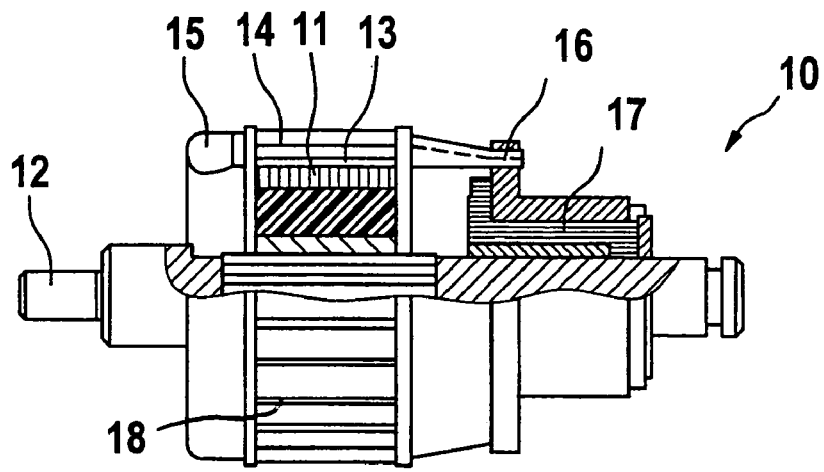
FIG. 1 is a view showing a commutator armature of an electrical machine with a groove packet of metal sheets, partially in a longitudinal section.

FIG. 1 is a view showing a commutator armature of electrical machine, partially in a longitudinal section, which in the presented example is an armature of a stator motor for internal combustion engines in motor vehicles. The armature 10 has a drum-shape packet of metal sheets 11 which is pressed of metal sheets lamellas. It is pressed as a base body on a machine shaft 12.

The packet 11 of the metal sheets has a plurality of grooves 13 which are uniformly distributed on its outer periphery. The grooves have an elongated cross-section extending axially to the machine shaft. The armature 10 cooperates through a working air gap with a not shown stator of the electrical machine, which surrounds in a ring-shaped manner the packet 11 of the metal sheets. Conductors 14 of an armature winding 15 are inserted in the grooves 13. They are composed of hairpin-shaped bent winding elements, whose free ends are connected to connecting lugs 16 of a drum commutator 17. The grooves 13 are provided with a groove slot 18 toward an outer periphery of the packet of the metal sheets 11 and thereby toward the working air gap.

Figure 2:
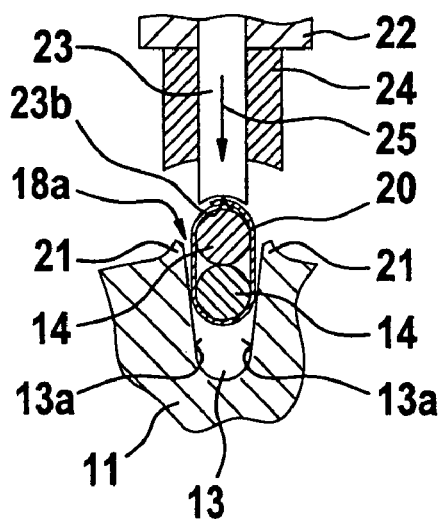
FIG. 2 is a view showing a first embodiment of a portion of the packet of the metal sheets with a groove and two inserted conductors with a round cross-section before the deformation by two-part punching tool.
Figure 3:
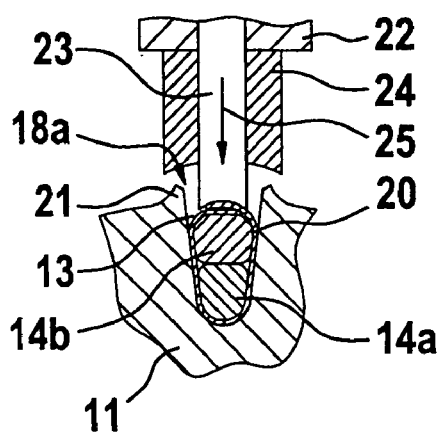
FIG. 3 is a view showing a partial section of FIG. 2 with a stamping punch introduced in the groove for a conductor deformation.
Figure 4:
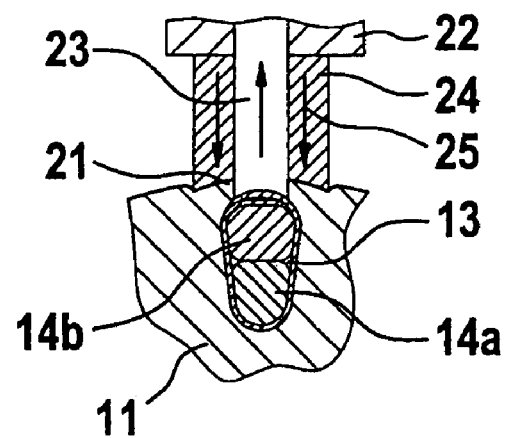
FIG. 4 shows a partial section of FIG. 3 with the placed pressing punch of the stamping tool for groove caulking and a stamping punch which is moved back.
Figure 5:
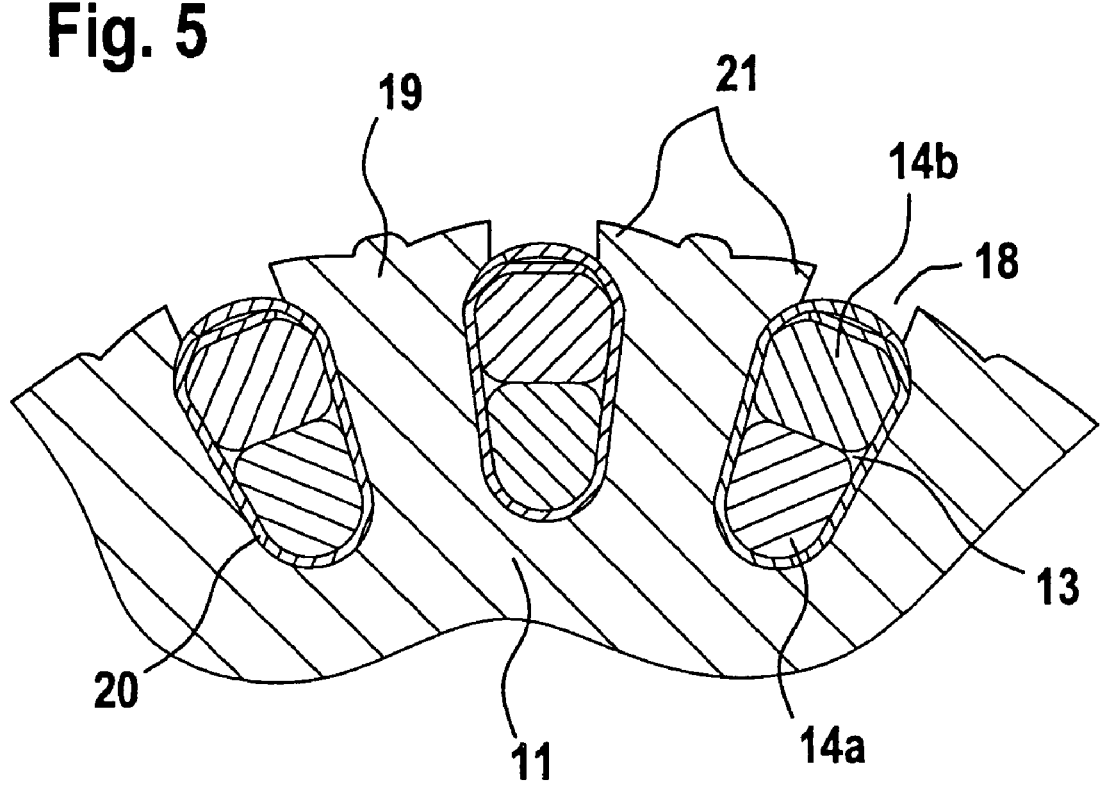
FIG. 5 is a view showing an expanded partial cross-section of the packet of the metal sheets with conductors which are deformed and fixed in the grooves.

FIGS. 2–5 show a first embodiment of a partial cross-section of the packet 11 of the metal sheets, with a groove 13 shown in the transverse cross-section. During the manufacture of the electrical machine, the conductors 14 of the armature winding 15 are utilized and in several manufacturing steps are deformed and fixed. FIG. 2 shows two conductors 14 which extend axially to the groove and arranged with a round cross-section radially over one another so as to be inserted into the groove 13 through an open groove slot 18a. The cross-section of the groove 13 is formed so that the groove width between the side walls 13a of the groove 13 increases outwardly toward the groove slot 18. Thereby pole teeth 19 are produced between the grooves 13. As shown in FIG. 5 they have approximately the same cross-section over the whole radial length and thereby provide a favorable distribution of the magnetic flux. The both conductors 14 are framed by an insulating paper 20 which is placed on the side walls 13a of the groove 13. Due to the V-shaped formation of the groove cross-section, the lower conductor can be inserted substantially to a center of the groove 13 and the upper conductor is located in the open groove slot 18a and partially above the groove 13. The material of the packet 11 of the metal sheets which limits the both sides of the groove slot 18 forms the edges 21 of the groove slot 18. In their original form, they extend vertically and thereby provide a further groove slot 18a for insertion of the conductor 14 into the groove 13.

In a following manufacturing step, a stamping tool 22 with a stamping punch 23 is arranged above the groove 13 and is axially displaceable toward the groove 13. At both sides of the stamping punch 23, two pressing punches 24 are arranged and are offset axially relative to the stamping punch 23 opposite to the stamping direction. The stamping punch 23 has a concavely curved end surface 23b which is placed on the upper conductor 14 as shown in FIG. 2, and surrounds it over the whole length of the groove 13, and thereby fixes at least the ends of the insulating paper 20.

In a next manufacturing step shown in FIG. 3 the stamping punch 23 is pressed through the open groove slot 18a in the stamping direction 25 into the groove 13. The groove nut 13 with the neighboring pole teeth 19 acts as a dye. The stamping punch 23 deforms both conductors 14 so that their conductor cross-section is adjusted to the groove cross-section in the region of the corresponding conductor. The lower conductor 14a thereby obtains a substantially trapezoidal cross-section while the upper conductor 14b obtains a substantially rectangular cross-section.

In a following working step shown in FIG. 4, the pressing punches 24 arranged at both sides of the stamping punch 23 are displaced in the stamping direction 25. They are placed on the vertical edges 23 on the groove slot 18a. The edges 23 are deformed by the pressing punches 24 so that they are supported on both conductors 14b as well as on the sides of the stamping punch 23, and thereby the conductors 14a, 14b are fixed in the groove 13. Simultaneously the stamping punch 23 is pulled back opposite to the stamping direction 25 from the groove slot 18. If needed, the groove slot 18 can be further closed. In this manner, with corresponding material accumulation of the edges 21, the required groove slot width during deformation by the stamping punch 24 can be exactly adjusted to reliably fix the conductors 14 and the grooves 14. FIG. 5 finally shows a partial cross-section of the packet of the metal sheets 11, with the conductor cross-section adjusted to the cross-section in the corresponding region of the groove 13 and with narrowed, semiclosed groove slot 18.

Figure 6:
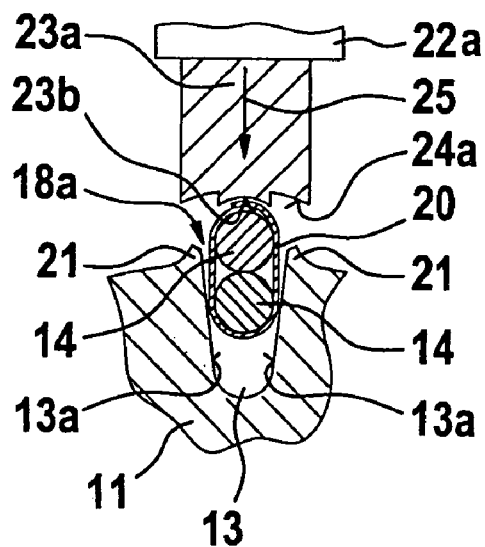
FIGS. 6–8 are views showing further embodiments of a packet of metal sheets of FIGS. 2–4 with a one-piece stamping tool for conductor and groove slot deformation.
Figure 7:
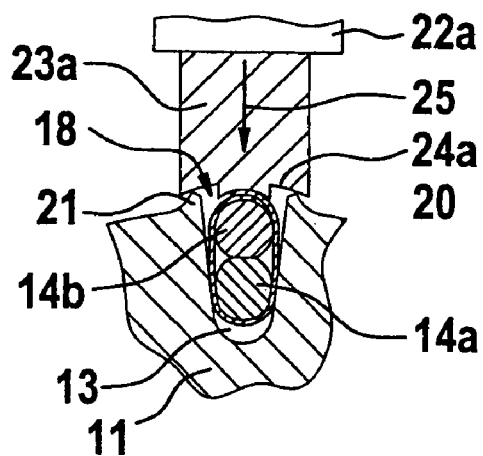
Figure 8:
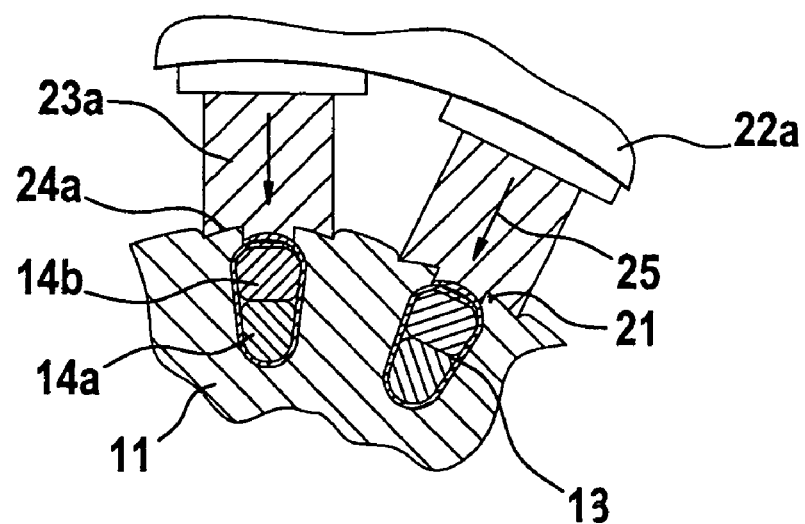

FIGS. 6–8 of a further embodiment on the partial cross-section of the metal sheet 3 of the packet of the metal sheets 11 with the groove 13, shows/how the conductor 14 is deformed and fixed with a different stamping tool 22a, in the groove 13. Instead of the both pressing punches 24 of FIGS. 2–4, here a one-piece stamping tool 22a is provided at both sides of the stamping punch 23a with pressure shoulders 24a, which are offset relative to the end surface 23b of the stamping punch 23a. Here also first after the insertion of the conductors 14 in the grooves 13 of the packet of the metal sheets 11 in FIG. 2, the stamping punch 23a is placed on the upper conductor 14b which extends outwardly beyond the opening grooves 18a, over the total length of the packet of the metal sheets 11 and thereby clamps the insulating paper 20.

In FIG. 7 the stamping punch 23 is then pressed in the stamping direction 25 into the open groove slot 18a, so that the conductor 14 is pressed almost against the bottom of the groove 13 and thereby is deformed in the cross-section so that it is adjusted to the groove cross-section in the corresponding region of the groove 13.

In accordance with FIG. 8, by further lowering of the stamping punch 23a, the vertically extending edges 21 of the open groove slot 18a are deformed by the pressure shoulders 24a of the stamping punch 23a so that they are supported laterally on the front portion of the stamping punch 23a as well as on the upper conductor 14b. Thereby the groove slot 18 is partially closed and the conductors 14a and 14b are fixed in the groove 13. Moreover, the conductors are pressed against the groove bottom in their final position and shape.

As shown in FIG. 8, the stamping tool 22a is provided with iris-like arranged stamping punches 23a. Therefore the conductors 14 in all grooves 13 can be deformed and fixed simultaneously by the stamping punches 23a.

The described embodiments can be used not only for a grooved packet of metal sheets of an armature shown in FIG. 1, but also they can be used for grooved base bodies of a soft magnetic material on the rotor or on the stator, with a base body composed of a soft-magnetic material and provided with conductors. The electrical machines can be provided with an inner rotor, an outer rotor and also with a disc rotor.

In accordance with the present invention a caulking of the groove slot 18 can be dispensed with, when the groove slot on the one hand is sufficiently wide to receive the stamping punch 23, and on the other hand is sufficiently narrow to fix the conductors after the removal of the stamping punch 23 in the groove 13. The additional groove caulking is however advantageous, since with a further groove slot 18, a corresponding robust stamping punch 23 or 23a can be utilized, to adjust the conductors 14 in the grooves 13 by deformation of the groove cross-section. In addition, also several conductors can be arranged in the grooves under one another and/or near one another and deformed.

It will be understood that each of the elements described above, or two or more together, may also find a useful application in other types of constructions differing from the types described above.

While the invention has been illustrated and described as embodied in electrical machine, method of producing the same and device for producing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of producing electrical machines, comprising the steps of providing a base body, wherein said base body is an armature of said electrical machine, said base body comprising a drum-shaped packet of metal sheets, wherein said metal sheets are made of soft-magnetic material, said base body having a periphery which limits a working air gap and has a plurality of grooves with an elongated cross-section and with a groove slot adapted to face the working air gap; introducing at least one insulated electrical conductor in each of said grooves so that said at least one insulated electrical conductor extends over a length of the groove and is fixed in said grooves by a material of the base body which limits the groove slot at both sides; and after insertion of the at least one insulated electrical conductor in the grooves of the base body, introducing a stamping punch into the open groove slot of the grooves and deforming the at least one insulated electrical conductor with the stamping punch over a whole groove length so that its conductor cross-section is adjusted to a groove cross-section in the region of the at least one insulated electrical conductor.

2. The method as defined in claim 1; and further comprising inserting a plurality of the conductors into the grooves parallel to one another; and adjusting a total conductor cross-section of all conductors of one groove by the stamping punch to a total groove cross-section.

3. The method as defined in claim 2; and further comprising inserting two conductors which extend axially parallel to one another and are located radially over one another into the grooves, so that an upper one of the conductors is located in an open groove slot and partially extends above the grove; and adjusting a conductor cross-section of the upper conductor by the stamping punch to a groove cross-section in a region of the corresponding conductor.

4. The method as defined in claim 1; and further comprising after the stamping of the conductor of one groove, pressing and deforming a material of the base body at both sides of the groove slot in a further stamping step against the conductor for fixing the conductor in the groove, so that the groove slot is at least partially closed.

5. The method as defined in claim 4; and further comprising moving back the stamping punch from the groove slot for deforming the at least one conductor of one groove, after the further stamping step for deforming the material on the groove slot.

6. The method as defined in claim 1; and further comprising performing a stamping process on an element selected from the group consisting of the groove slot, the at least one conductor of one groove, and both, in steps from one groove to another groove.

7. The method as defined in claim 1; and further comprising performing a stamping process on an element selected from the group consisting of a groove slot, at least one conductor of one groove, and both, simultaneously on oppositely located grooves of the base body.

8. The method as defined in claim 1; and further comprising performing a stamping process on an element selected from the group consisting of a groove slot, at least one conductor of one groove, and both, simultaneously on all grooves of the base body.

* * * * *